(12) United States Patent
Aley-Raz et al.

(10) Patent No.: US 10,529,338 B2
(45) Date of Patent: Jan. 7, 2020

(54) METHOD AND APPARATUS FOR PERFORMING SPEAKER RECOGNITION

(71) Applicant: Nuance Communications, Inc., Burlington, MA (US)

(72) Inventors: Almog Aley-Raz, Sde Warburg (IL); Kevin R. Farrell, Medford, MA (US); Oshrit Yaron, Qadima (IL); Luca Scarpato, Turin (IT)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 16/019,447

(22) Filed: Jun. 26, 2018

(65) Prior Publication Data
US 2019/0035406 A1    Jan. 31, 2019

Related U.S. Application Data

(63) Continuation of application No. 14/489,996, filed on Sep. 18, 2014, now Pat. No. 10,008,208.

(51) Int. Cl.
| | |
|---|---|
| *G10L 17/12* | (2013.01) |
| *G10L 17/14* | (2013.01) |
| *G10L 17/24* | (2013.01) |
| *G10L 17/06* | (2013.01) |

(52) U.S. Cl.
CPC .............. *G10L 17/12* (2013.01); *G10L 17/14* (2013.01); *G10L 17/24* (2013.01); *G10L 17/06* (2013.01)

(58) Field of Classification Search
CPC ....................................................... G10L 17/24
See application file for complete search history.

(56) References Cited

U.S. PATENT DOCUMENTS

| | | | |
|---|---|---|---|
| 5,127,043 A | 6/1992 | Hunt et al. | |
| 5,297,194 A | 3/1994 | Hunt et al. | |
| 5,499,288 A | 3/1996 | Hunt et al. | |
| 5,517,558 A | 5/1996 | Schalk | |
| 5,745,555 A | 4/1998 | Mark | |
| 5,806,040 A | 9/1998 | Vensko | |
| 5,897,616 A | 4/1999 | Kanevsky et al. | |
| 5,913,192 A | 6/1999 | Parthasarathy et al. | |
| 6,272,463 B1 | 8/2001 | Lapere | |
| 6,671,672 B1 | 12/2003 | Heck | |
| 6,691,089 B1 | 2/2004 | Su et al. | |

(Continued)

FOREIGN PATENT DOCUMENTS

| | | |
|---|---|---|
| EP | 0856836 A2 | 8/1998 |
| WO | 2016044027 A1 | 3/2016 |

OTHER PUBLICATIONS

European Search Report, EP 0 856 836 A3, "Speaker recognition device", dated Feb. 3, 1999.

(Continued)

*Primary Examiner* — Matthew H Baker
(74) *Attorney, Agent, or Firm* — Hamilton, Brook, Smith & Reynolds, P.C.

(57) ABSTRACT

Embodiments of the present invention perform speaker identification and verification by first prompting a user to speak a phrase that includes a common phrase component and a personal identifier. Then, the embodiments decompose the spoken phrase to locate the personal identifier. Finally, the embodiments identify and verify the user based on the results of the decomposing.

20 Claims, 6 Drawing Sheets

(56) References Cited

U.S. PATENT DOCUMENTS

| | | | |
|---|---|---|---|
| 6,978,238 B2 | 12/2005 | Wohlsen et al. | |
| 7,386,448 B1* | 6/2008 | Poss | G10L 17/24 |
| | | | 379/188 |
| 7,447,632 B2 | 11/2008 | Itou | |
| 7,773,730 B1 | 8/2010 | Kittrell et al. | |
| 8,010,367 B2 | 8/2011 | Muschett et al. | |
| 8,036,902 B1 | 10/2011 | Strom et al. | |
| 8,095,369 B1 | 1/2012 | McIntosh et al. | |
| 8,255,223 B2 | 8/2012 | Wang | |
| 8,499,342 B1 | 7/2013 | Macwan | |
| 8,682,667 B2 | 3/2014 | Haughay | |
| 8,762,149 B2 | 6/2014 | Asenjo et al. | |
| 10,008,208 B2 | 6/2018 | Aley-Raz et al. | |
| 2002/0103656 A1 | 8/2002 | Bahler et al. | |
| 2002/0104027 A1 | 8/2002 | Skerpac | |
| 2005/0235341 A1 | 10/2005 | Stieglitz et al. | |
| 2006/0277043 A1 | 12/2006 | Tomes et al. | |
| 2007/0055517 A1 | 3/2007 | Spector | |
| 2007/0185718 A1 | 8/2007 | Di Mambro et al. | |
| 2008/0141353 A1 | 6/2008 | Brown | |
| 2008/0195389 A1 | 8/2008 | Zhang et al. | |
| 2009/0319271 A1 | 12/2009 | Gross | |
| 2011/0213615 A1* | 9/2011 | Summerfield | G06F 21/32 |
| | | | 704/246 |
| 2011/0276323 A1 | 11/2011 | Seyfetdinov | |
| 2012/0130714 A1 | 5/2012 | Zeljkovic et al. | |
| 2012/0253809 A1 | 10/2012 | Thomas et al. | |
| 2012/0296649 A1 | 11/2012 | Bansal et al. | |
| 2013/0132091 A1 | 5/2013 | Skerpac | |
| 2013/0166296 A1 | 6/2013 | Scheller | |
| 2014/0012586 A1 | 1/2014 | Rubin et al. | |
| 2014/0188468 A1 | 7/2014 | Dyrmovskiy et al. | |
| 2015/0095028 A1* | 4/2015 | Karpey | G10L 17/26 |
| | | | 704/246 |
| 2016/0086607 A1 | 3/2016 | Aley-Raz et al. | |

OTHER PUBLICATIONS

Heck, L., "Integrating Speaker and Speech Recognizers: Automatic Identity Claim Capture for Speaker Verification", 2001: A Speaker Odyssey the Speaker Recognition Workshop Crete, Greece, 6 pages, (Jun. 18-22, 2001).

International Preliminary Report on Patentability and Written Opinion of the International Searching Authority for International Application No. PCT/US2015/049205, entitled "Method and Apparatus for Performing Speaker Recognition", dated Mar. 21, 2017.

Speaker Identification and Verification Applications, Voice XML Forum Speaker Biometrics Committee. Feb. 2006.

Badvertised, "Sneakers (1992): My Voice Is My Passport," Online video clip, You Tube, Published on Jun. 10, 2013.

Gibbons, John, et al., "Voiceprint Biometric Authentication System," Group 2.3: 4., May 2, 2014.

* cited by examiner

METHOD AND APPARATUS FOR PERFORMING SPEAKER RECOGNITION

RELATED APPLICATION

This application is a continuation of U.S. application Ser. No. 14/489,996, filed on Sep. 18, 2014. The entire teachings of the above application(s) are incorporated herein by reference.

BACKGROUND OF THE INVENTION

Achieved advances in speech processing and media technology have led to a wide use of automated user-machine interaction across different applications and services. Using an automated user-machine interaction approach, businesses may provide customer services and other services with relatively inexpensive cost. Some such services may employ speaker recognition, i.e., identification and verification of the speaker.

SUMMARY OF THE INVENTION

Embodiments of the present invention provide methods and systems for speaker recognition. According to an embodiment of the present invention, a method of performing speaker recognition comprises prompting a user to speak a phrase including a personal identifier and a common phrase component, decomposing a received spoken phrase, the decomposing including locating the personal identifier within the spoken phrase, and finally, identifying and verifying the user based on results of the decomposing. According to such an embodiment, identifying the user comprises comparing the personal identifier against previously stored identifying information. Yet further still, according an embodiment, decomposing the received spoken phrase includes locating the common phrase component, wherein the common phrase component is a component of the spoken phrase common amongst users within at least a subgroup of all users.

According to an embodiment of the method, verifying the user comprises comparing the common phrase component against one or more previously stored voice prints associated with at least a subgroup of all users. In an alternative embodiment of the present invention, the common phrase component of the spoken phrase comprises two or more phrases and in such an embodiment, verifying the user includes calculating a respective score for each phrase of the common phrase component. According to such an embodiment, the respective scores indicate a level of correspondence between the two or more phrases and one or more stored voice prints. An embodiment uses the respective scores to verify the user. In yet another embodiment, the respective scores may be averaged, and then this average may be compared against a predetermined threshold in order to verify the user.

Further, such principles may be employed in an embodiment where the common phrase comprises only one component. In such an embodiment, a score is determined that indicates a level of correspondence between the received spoken phrase and one or more stored voice prints; the user is verified when the score is greater than a predetermined threshold. According to an embodiment, the decomposing is performed using keyword spotting. In another embodiment, the user is identified by first determining multiple candidate users associated with the personal identifier and then employing voice biometrics to identify the user among the multiple candidate users. In such an embodiment, employing voice biometrics includes comparing the common phrase component of the spoken phrase or the received spoken phrase against corresponding previously stored voice prints for each candidate user.

Yet another embodiment of the present invention is directed to a computer system for performing speaker recognition. In such embodiment the computer system comprises a processor and a memory with computer code instructions stored thereon. The processor and the memory, with the computer code instructions, are configured to cause the computer system to prompt a user to speak a phrase including a personal identifier and a common phrase component, decompose a received spoken phrase, the decomposing including locating the personal identifier within the spoken phrase, and identify and verify the user based on results of the decomposing.

In an embodiment of the computer system, identifying the user may comprise comparing the personal identifier against previously stored identifying information. In yet another embodiment of the computer system, in decomposing the received spoken phrase, the processor and the memory with the computer code instructions are configured to cause the system to locate the common phrase component, wherein the common phrase component is a component of the spoken phrase common amongst users within at least a subgroup of all users.

In yet another embodiment, the computer system is configured such that when verifying the user, the computer system is configured to compare the common phrase component against one or more previously stored voice prints associated with at least the subgroup of all users. In an alternative embodiment of the computer system, the common phrase component of the spoken phrase comprises two or more phrases and in verifying the user, the processor and the memory with the computer code instructions are configured to cause the system to calculate a respective score for each phrase of the common phrase, in which each respective score indicates a level of correspondence between the two or more phrases and one or more stored voice prints. In such an embodiment, the user is verified using the respective scores, for example, by comparing the scores to a threshold.

Similarly to embodiments of the method described hereinabove, verifying the user may include determining a score indicating the level of correspondence between the received spoken phrase and one or more stored voice prints and verifying the user when the score is greater than a predetermined threshold. An embodiment of the computer system is configured to employ key word spotting to decompose the received spoken phrase.

According to an alternative embodiment of the computer system, in identifying the user, the processor and the memory, with the computer code instructions are further configured to cause the system to determine multiple candidate users associated with the personal identifier and employ voice biometrics to identify the user among the multiple candidate users. In yet another embodiment of the computer system, in employing voice biometrics, the processor and the memory with the computer code instructions are further configured to cause the system to compare the common phrase component of the spoken phrase or the received spoken phrase against corresponding previously stored voice prints for each candidate user.

Yet another embodiment of the claimed invention is directed to a computer program product for performing speaker recognition. In such an embodiment, the computer program product comprises one or more computer-readable tangible storage devices and program instructions stored on at least one of the one or more storage devices, wherein the program instructions, when loaded and executed by a processor, cause an apparatus associated with the processor to prompt a user to speak a phrase including a personal identifier and a common phrase component, decompose a received spoken phrase, including locating the personal identifier within the spoken phrase, and identify and verify the user based on results of the decomposing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Embodiments of the present invention solve the problem of using common passphrase speaker verification without requiring a separate operation for providing the claimed identity. Whereas automatic speech recognition (ASR) and voice biometrics (VB) have previously been combined to implement identity claim verification on a single phrase, these prior methods always relied on the entire phrase being unique or mostly unique for each user. One of the problems with this technique is that unique passphrases are known to have higher error rates than common passphrases. This is because common passphrases benefit greatly from calibration.

Embodiments of the present invention instead rely upon phrases that contain both a unique component, for the identity claim, and a common component, so as to achieve higher accuracy speech verification. In embodiments described herein, the unique component of the passphrase may be extracted using keyword spotting. This is yet another distinction over existing methods, wherein such previous methods utilized the entire phrase for automatic speech recognition. One existing method for speech and speaker recognition requires two operations: first, a claimed identity is provided, and second, a common verification phrase is spoken. However, this two operation approach results in a longer session for validating the claimed identity. Another existing method is performed in one operation, albeit such a method suffers from problems with accuracy. In such a one-operation method, the user speaks a unique passphrase such as an account number or phone number, and then this unique passphrase, is processed with automatic speech recognition to retrieve the claimed identity, followed by evaluating that same unique passphrase with a stored voice print to verify the claimed identification. This method, however, does not have the accuracy benefits that can be achieved when using a common phrase.

Unlike the existing methods, embodiments of the current invention provide the accuracy of the existing two operation method while not requiring a separate operation for providing the claimed identity. Further embodiments of the present invention provide better speaker verification accuracy than existing one operation approaches by using a common passphrase or nearly common passphrase.

Text-dependent speaker verification is the predominant voice biometric technology used in commercial applications. Common passphrase verification, i.e., where all users enroll and verify with the same phrase, such as "my voice is my password," is the most accurate form of text-dependent speaker verification. Common passphrase verification allows for a powerful tuning operation known as calibration, where the system parameters can be tuned for this specific phrase, e.g., "my voice is my password." The tuning is performed using a set of audio data corresponding to that specific phrase. This calibration operation allows for a roughly 30% reduction to the error rate. Calibration, however, has much less benefit when users do not use a common phrase but instead use a unique phrase.

However, common passphrase verification is not without its own drawbacks. One of the downsides of using a common phrase for enrollment and verification is that a separate operation is needed for providing the claimed identity. For example, when a bank customer attempts to gain access to his or her account with voice biometrics, the customer cannot just speak a common passphrase and hope that the system will accurately identify him or her among, potentially, millions of users. This is because speaker identification is a much more difficult problem than speaker verification, and the error rates in such a scenario along with the computer processing requirements would be prohibitive for successful deployment. Thus, the user must first provide a claimed identity, such as an account number, phone number, or full name, followed by a separate utterance of the user's voice biometric passphrase.

Embodiments of the present invention provide the accuracy benefits of common passphrase speaker verification while not requiring a separate operation to provide the claimed identity. An example embodiment implements this approach by having the user speak a phrase that contains both a pseudo-unique identifier along with a common phrase portion. One such example is "My name is John Smith, and my voice is my password." In this phrase, the name, John Smith, serves as the pseudo-unique identifier, while the rest of the phrase corresponds to the common phrase portion. When provided with such an input phrase, automatic speech recognition or specifically, keyword spotting, can be used to extract the pseudo-unique identifier, John Smith. The pseudo-unique identifier can then be used to retrieve the voice print corresponding to the claimed user identification, John Smith. At this point, a system operating according to principles of the present invention can process the full phrase, which is nearly common or extracted common phrase component(s) with the selected voice print to verify the speaker. Additionally, in the event that the personal identifier is not unique, i.e., if there are multiple entries for John Smith, the voice print comparison can be performed for all entries to select the one having the best match.

The aforementioned embodiments may be applied more generally as well. An embodiment of the present invention may first determine an "n-best" list of candidates based upon the personal identifier, which may be identified by an ASR engine. This "n-best" list can then be searched in the context of the voice print match, i.e., after identifying the potential candidates, corresponding stored voice prints for the identified candidates can be compared to the spoken phrase to identify and verify the speaker. This approach will ultimately allow a user to speak a single phrase that provides both the claimed identity and a common or nearly common passphrase. This process is known in the voice biometrics community as "ID&V" or "identification and verification." Whereas ID&V has previously been performed by using only a unique passphrase, such as an account number, such a method results in lower accuracy than embodiments of the present invention.

Figure 1:
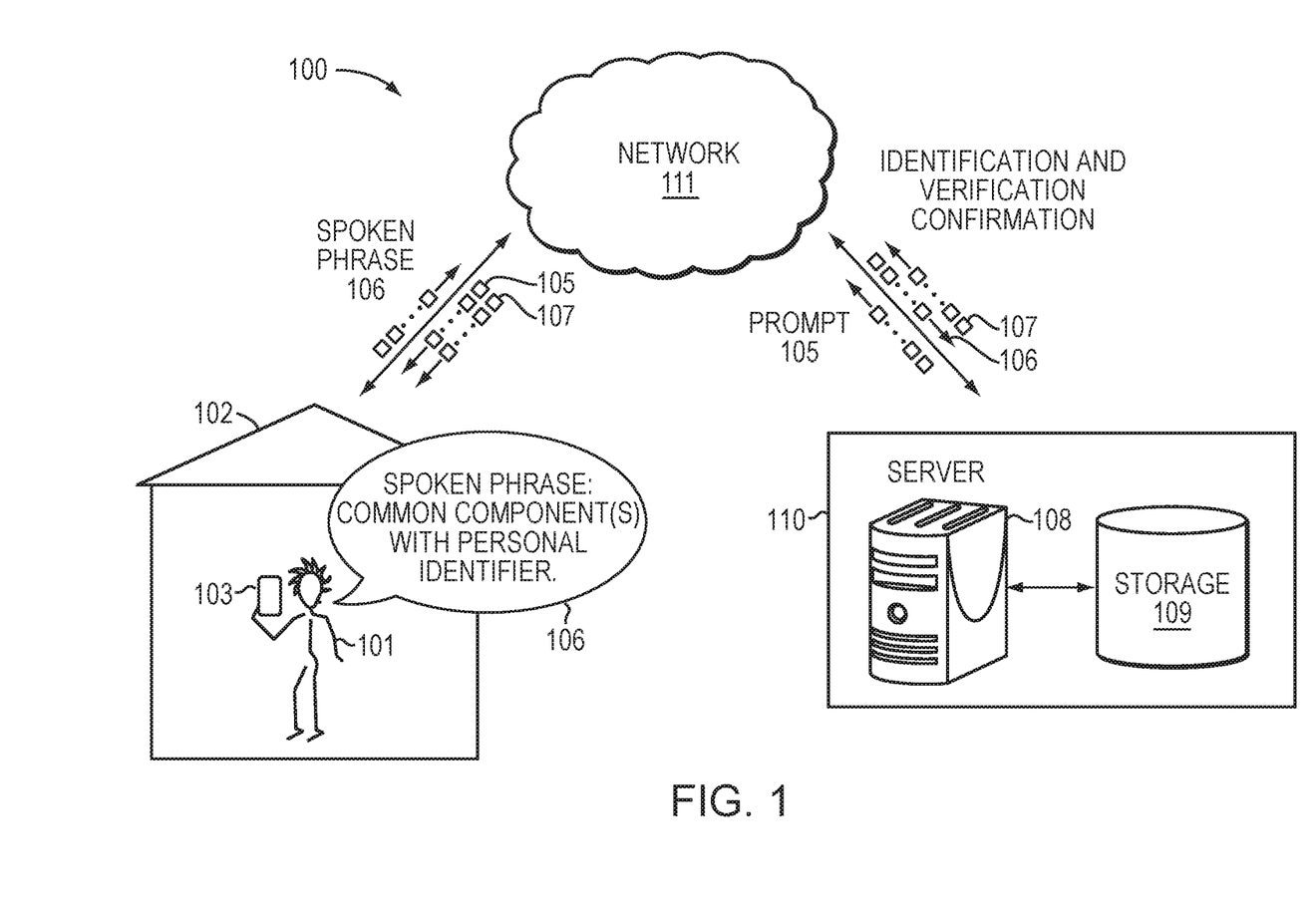
FIG. 1 is an example environment in which embodiments of the present invention may be implemented.

FIG. 1 is a simplified diagram of an environment 100 in which embodiments of the present invention may be employed. The example environment 100 comprises a user location 102 from which a user 101 can make calls via a device 103. The device 103 may be any communication device known in the art, such as a cellular phone. The environment 100 further comprises a computer processing environment 110, which may be geographically separated from the user's location 102. The computer processing environment 110 includes a server 108 and a storage device 109. The server 108 may be any processing device as is known in the art. Further, the storage device 109 may be a hard disk drive, solid state storage device, database, or any other storage device known in the art. Additionally, the environment 110 comprises a network 111, which provides a communication connection between the user location 102 and the computer processing environment 110. The network 111 may be any network known in the art, such as a local area network (LAN), wide area network (WAN), public switched telephone network (PSTN), and/or any network known in the art or combination of networks.

An example of performing an embodiment in the environment 100 is described hereinbelow. According to such an example, the user 101 is attempting to contact a bank's customer service center to inquire about account information. The bank, in turn, routes calls through the computing environment 110 to perform identification and verification of the user 101. According to such an embodiment, the user 101 places a call using the handheld device 103 via the network 111. In response to the call, the computing environment 110, via the server 108, sends a prompt 105 to the user 101. An example prompt 105 may be, "Please speak, 'My name is Your Name and my voice is my password'." The user 101 then responds to the prompt 105 and the spoken phrase 106 is sent to the computing environment 110 via the network 111. The spoken phrase 106 is received at the computing environment 110. At the computing environment 110, the spoken phrase is decomposed and the personal identifier portion, i.e., "Your Name" is identified. The server 108 then identifies and verifies the user based upon the results of the decomposing and using information stored on the storage device 109, such as a voice print. In response, the server 108 then sends an identification and verification confirmation 107 to the user 101 via the network 111. After performing identification and verification, the computing environment 110 may facilitate a communications connection between the user 101 and a call center, such as the bank customer service center.

Further detail regarding decomposing and identification and verification performed by the computing environment 110 is described hereinbelow. The computing environment 110 along with the server 108 and the storage device 109 may be configured to perform any embodiment described herein.

Figure 2:
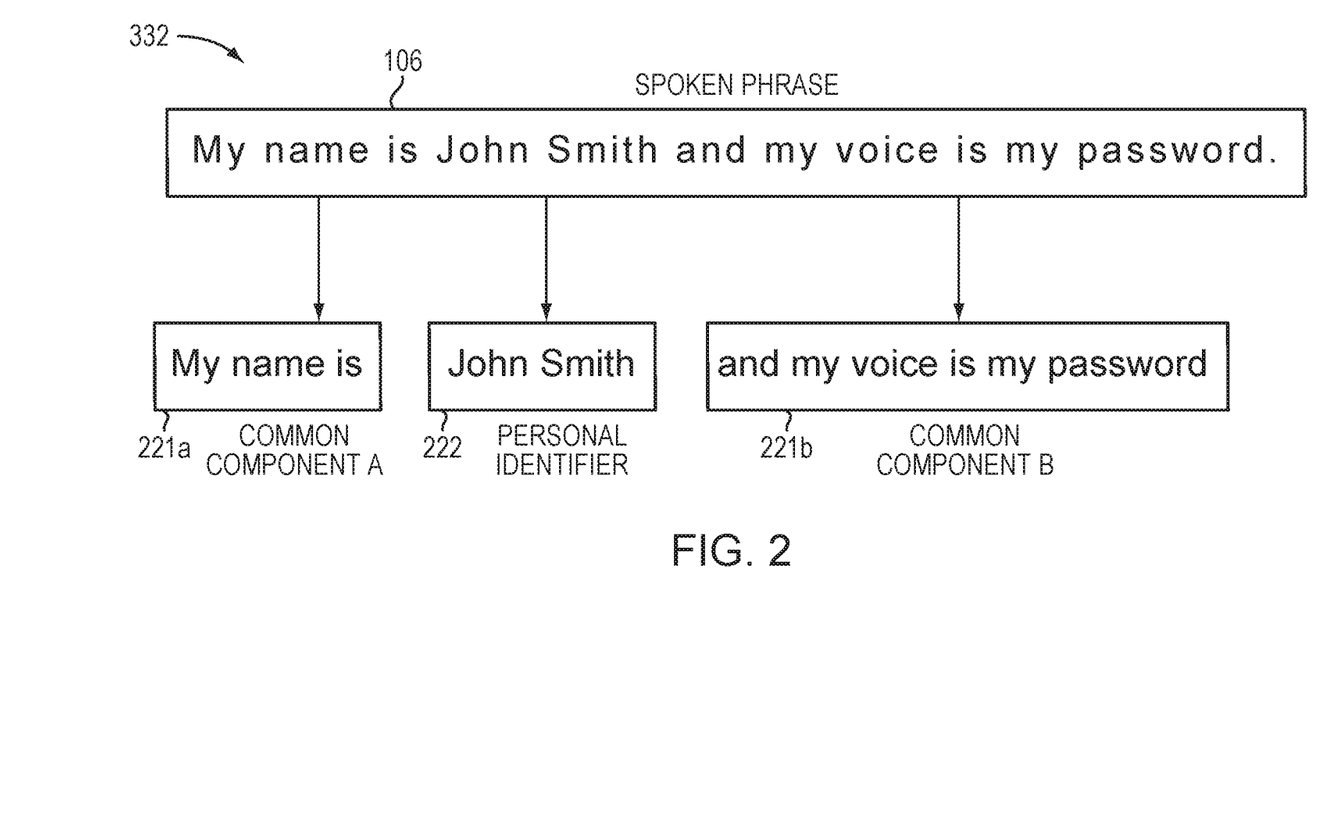
FIG. 2 illustrates a simplified diagram of decomposing a spoken phrase that may be utilized in an embodiment of the present invention.

FIG. 2 is a simplified diagram of a decomposing process 332 that may be performed on a spoken phrase according to an embodiment of the present invention. As described hereinabove, in an embodiment, when the prompt phrase is spoken by a user, such as the user 101, the phrase is decomposed (332) such that identification and verification of the user can be performed.

The method 332 in FIG. 2 illustrates one such method of performing decomposition of a spoken phrase. According to the method 332, the spoken phrase 106 is decomposed into the common components 221a and 221b and personal identifier component 222. In such an embodiment the personal identifier may be identified using ASR, or more specifically, keyword spotting as is known in the art. The common phrase components 221a and 222b may be identified after using keyword spotting to locate the personal identifier 222 such that the remaining portions of the phrase 106 are identified as the common phrase components 221a and 221b. In the example embodiment illustrated in FIG. 2, the spoken phrase, "My name is John Smith and my voice is my password" is decomposed into the common components "My name is" and "and my voice is my password" and the personal identifier portion "John Smith." According to an alternative embodiment of the method 332, the decomposing only comprises identifying the personal identifier 222.

Figure 3:
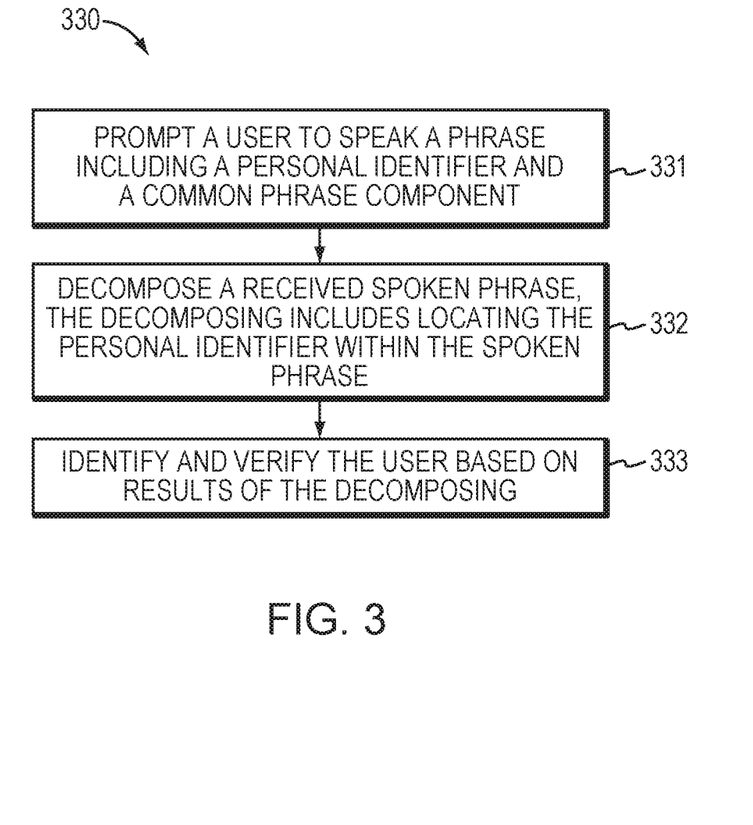
FIG. 3 is a flowchart illustrating a method of speaker recognition according to the principles of the present invention.

FIG. 3 illustrates a method 330 for performing speaker recognition. The method 330 begins by prompting a user to speak a phrase that includes a personal identifier and a common phrase component (331). Next, the received spoken phrase is decomposed (332). The decomposing 332 includes, at least, locating the personal identifier in the received spoken phrase. The method 330 concludes by identifying and verifying the user based on the results of the decomposing (333).

The decomposing 332 may be performed as described hereinabove in relation to FIG. 2. Additionally, the user may be identified and verified, 333, according to any embodiment described herein, such as described hereinbelow in relation to FIG. 4. The method 330 may be implemented in the environment 100 by the computing environment 110. Further, the method 330 may be implemented in computer code instructions that are executed by a processing device.

The method 330 may further comprise, according to an embodiment of the method 330, identifying the user by comparing the personal identifier against previously stored identifying information. Further still, in an alternative embodiment of the method 330, decomposing further includes locating the common phrase component wherein the common phrase component is a component of the spoken phrase that is common amongst users within at least a subgroup of all users. According to such an embodiment, verifying the user comprises comparing the common phrase component against one or more previously stored voice prints associated with at least the subgroup of all users. Further still, in yet another embodiment, the common phrase component comprises two or more phrases, for example, as illustrated in FIG. 2, and the verifying includes calculating a respective score for each common phrase component. In such an embodiment, the respective scores indicate a level of correspondence between two or more phrases and one or more stored voice prints and the verifying may use the respective scores. The user may be verified by using the respective scores according to any mathematical methods, for example the respective scores may be averaged and the average may be compared against a predetermined threshold.

Another embodiment of the method 330 further includes enrolling a user. According to such an embodiment, enrolling the user comprises prompting the user to speak the passphrase or common components of the passphrase. These spoken phrases may then be stored and/or one or more voice prints may be generated from the spoken phrases and stored. The stored phrases and/or voice print(s) may then be used for performing ID&V according to an embodiment of the method 330.

According to an embodiment of the method 330, identifying the user 333, comprises comparing the personal identifier, identified in the decomposing 332, against previously stored identifying information. According to an alternative embodiment, the decomposing 332 further includes locating the common phrase component, wherein the common phrase component is a component of the spoken phrase that is common amongst users within at least a subgroup of all users. In such an embodiment, verifying the user 333, comprises comparing the common phrase component against one or more previously stored voice prints associated with at least the subgroup of all users.

According to an embodiment, the "common phrase" component may be one or more components of the passphrase, or the entire passphrase itself. For example, in reference to FIG. 2, comparing the common phrase component to verify the user may comprise comparing the common component 221a, 221b, and/or the entire passphrase 106. According to an embodiment, verifying the user 333 includes calculating a respective score for each phrase of the common phrase component, i.e., 221a and 221b, wherein the respective scores indicate a level of correspondence between each respective phrase and one or more stored voice prints. In turn, the user may be verified, 333 using the respective scores.

According to an alternative embodiment, a score may also be determined by comparing the entire phrase 106 against one or more stored voice prints. Further still, scores may be determined for the entire phrase 106, and each component 221a and 221b individually, and then these scores may be used to verify the user (333). For example, the scores may be averaged and then the average may be compared against a threshold, and the user may be considered verified, when the score is above a threshold. Further, a score may be determined for a single component of the phrase, or some combination of components and then these one or more scores used to verify the user. According to an embodiment, the longest portion of the spoken phrase may be used for the voice print comparison to verify the user, or a portion of the passphrase with the highest quality audio, or some other portion, as may be determined by one of skill in the art.

According to an embodiment of the method 330, the decomposing is performed using keyword spotting. In an embodiment, employing voice biometrics includes comparing the common phrase component of the spoken phrase or the received spoken phrase against corresponding previously stored voice prints for each candidate user. In yet another embodiment, identifying the user comprises determining multiple candidate users each associated with a personal identifier and then employing voice biometrics to identify the user among the multiple candidate users. Such an example may occur where, for example, the personal identifier that is spoken is similar to other personal identifiers stored in the system. For example, if the system stores John Smith, Tom Smith, and John Smith, these may all be sufficiently similar such that the system cannot differentiate between the personal identifiers when one is spoken by a user. Then, in such an embodiment, voice biometrics is used to select the person.

Figure 4:
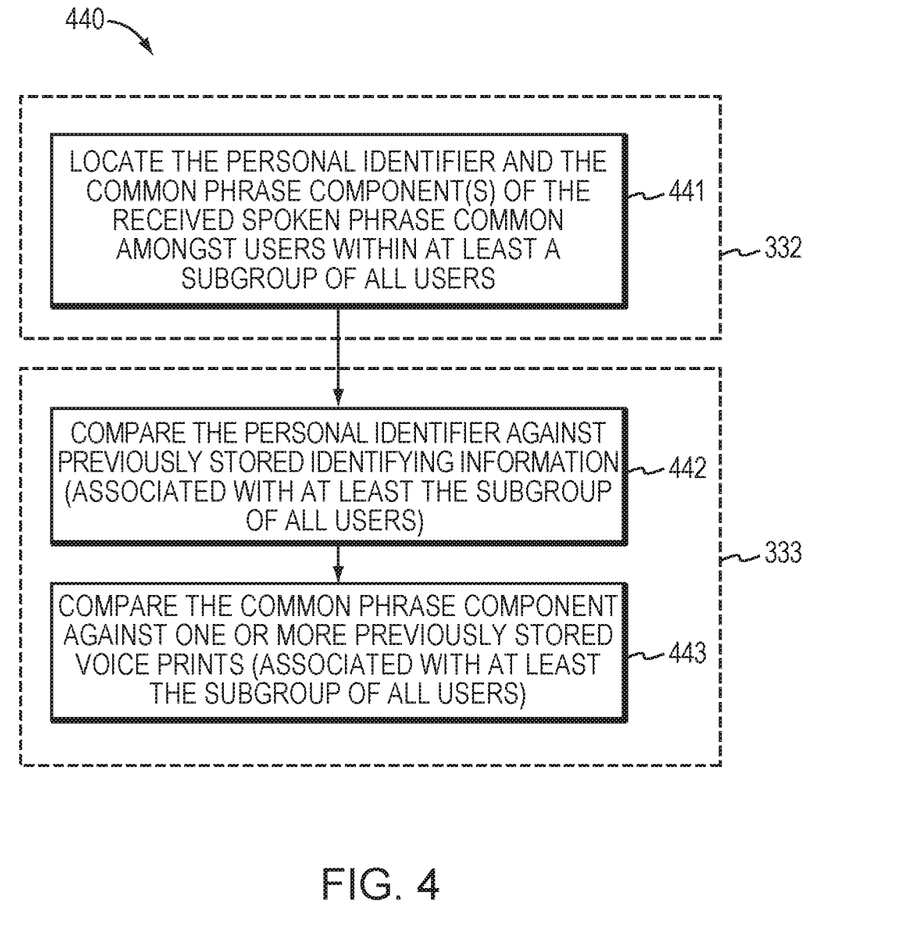
FIG. 4 is a simplified diagram of a method of decomposing a phrase and identifying and verifying a user according to an embodiment of the present invention.

FIG. 4 illustrates a method 440 of performing speaker recognition (identification and verification) according to an example embodiment using the principles of the present invention. Specifically, the method 440 illustrates an example method of processing a received spoken phrase. The method 440 may be employed in the method 330 illustrated in FIG. 3 and described hereinabove. The method 440 begins by locating the personal identifier and common phrase component(s) of the received spoken phrase common amongst users within at least a subgroup of all users (441). The method 440 continues by comparing the personal identifier against previously stored identifying information that may be associated with at least the subgroup of all users (442) to identify the user. Finally, the common phrase components are compared against one or more previously stored voice prints, wherein the voice prints may be associated with at least the same subgroup of users (443) to verify the user.

The locating 441 may be employed in the decomposition operation 332 of the method 330. As described herein, using common phrase components can improve the accuracy of identification and verification. However, according to an embodiment of the invention, it may be advantageous to have "groups" of common phrase components, i.e., different groupings of people will be prompted to speak different common phrase components. For example, people may be prompted to speak a passphrase based upon the geographic location from which they are calling, the specific number they are trying to contact, or a preferred language. As an example, users with a preferred status, possibly determined by account balance, may be prompted to speak a different passphrase. In yet another example, in a multi-lingual deployment, for example in Canada, some users may be prompted to speak the passphrase in French, while others are prompted to say the passphrase in English. In such an example, one subgroup corresponds to those using the French passphrase whereas another subgroup corresponds to those using the English passphrase. In an example embodiment, the decomposing 441 may consider the subgroup, in other words, the decomposing is configured to seek the appropriate components depending upon one or more characteristics of the subgroup, i.e., language.

Comparing the personal identifier (442) and comparing the common phrase component (443) may be performed at comparison operation 333 of the method 330. According to an embodiment, comparing the personal identifier (442) identifies the user. Comparing the personal identifier (442) may also identify multiple "candidate users," i.e., possible people who may have spoken the passphrase. Such an example may occur where, for example, the personal identifier that is spoken is similar to other personal identifiers stored in the system. In such an embodiment, when comparing the personal identifier against previously stored identifying information, multiple candidate users are identified. Then, voice biometrics can be employed to identify the user among the multiple candidate users by comparing the common phrase component against one or more previously stored voice prints (443). In both comparing the personal identifier against previously stored identifying information (442) and comparing the common phrase component against one or more previously stored voice prints (443), such comparisons may be made at the level of the entire universe of users or at some subgroup of users. For example, if the passphrase spoken by the user is only associated with a subgroup of users, the comparisons 442 and 443 may only be performed using data associated with said subgroup of users. Such an embodiment may allow for more efficient processing.

According to embodiments of the present invention, voice prints may be based upon an actual speech utterance spoken by a user. For example, upon setting up a bank account, a user may be required to speak the spoken phrase, some portion thereof, and this information may be stored for further use, such as identification and verification as described herein. The original spoken phrase may also be processed to create a voice print, which may be a model or parametric representation of the speech utterance.

Figure 5:
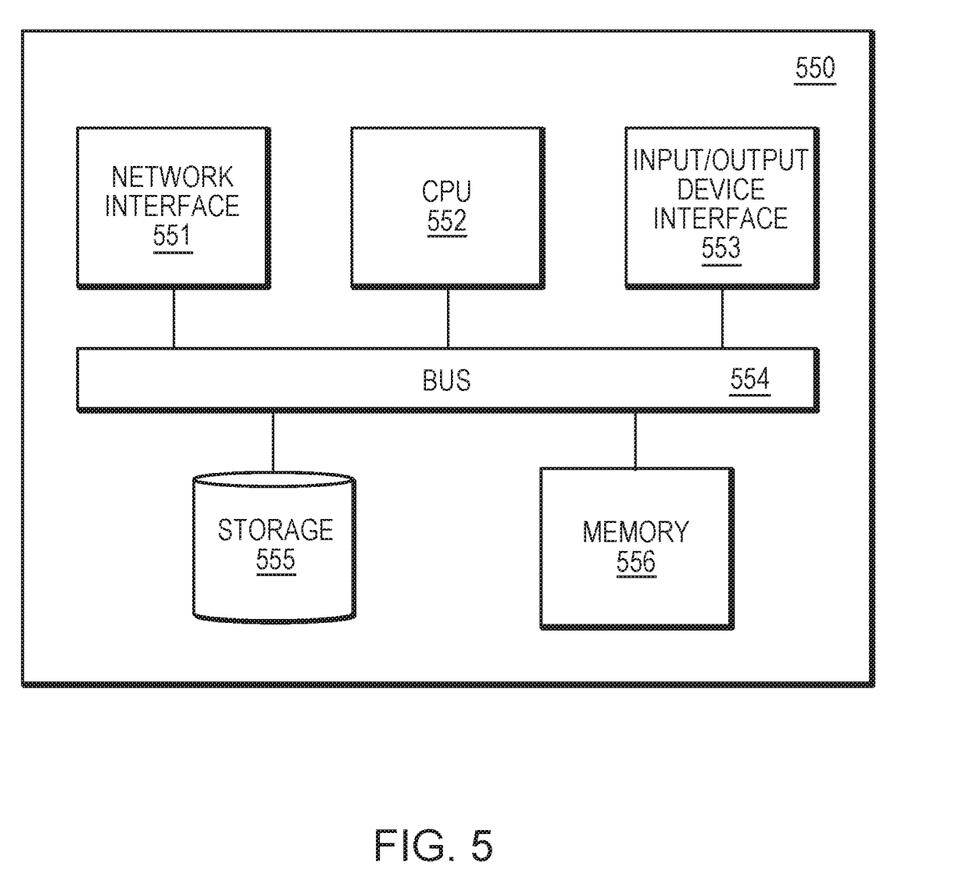
FIG. 5 is a simplified diagram of a computer system that may be configured to implement embodiments of the present invention.

FIG. 5 is simplified block diagram of a computer based system 550 that may be used to perform identification and verification according to an embodiment of the present invention. The system 550 comprises a bus 554. The bus 554 serves as an interconnect between the various components of the system 550. Connected to the bus 554 is an input-output device interface 553 for connecting various input and output devices such as a keyboard, mouse, display, speakers, etc. to the system 550. A central processing unit (CPU) 552 is connected to the bus 554 and provides for the execution of computer instructions. Memory 556 provides volatile storage for data used for carrying out computer instructions. Storage 555 provides nonvolatile storage for software instructions, such as an operating system (not shown). The system 550 also comprises a network interface 551 for connecting to any variety of networks known in the art, including WANs and LANs.

Figure 6:
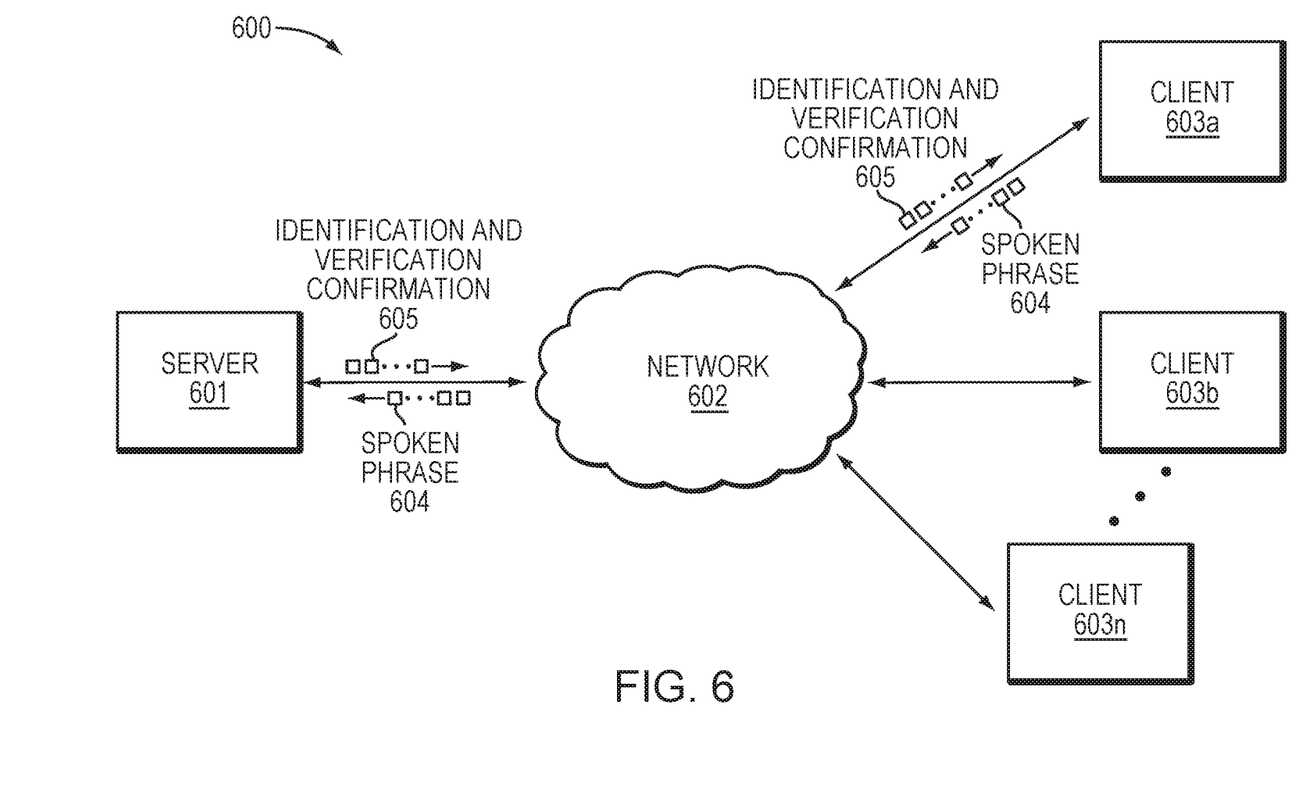
FIG. 6 is a simplified diagram of a computer network environment in which an embodiment of the present invention may be implemented.

It should be understood that the example embodiments described herein may be implemented in many different ways. In some instances, the various methods and machines described herein may each be implemented by a physical, virtual, or hybrid general-purpose computer, such as the computer system 550, or a computer network environment such as the computer environment 600 described hereinbelow. The computer system 550 may be transformed into the machines that execute the methods described herein, for example, by loading software instructions into either memory 556 or non-volatile storage 555 for execution by the CPU 552. The system 550 and its various components may be configured to carry out any embodiments of the present invention described herein.

For example, the system 550 may be configured to carry out the method 330 described hereinabove in relation to FIG. 3. In such an example embodiment, the CPU 552, and the memory 556, with computer code instructions stored on the memory 556 and/or the storage device 555, configure the apparatus 550 to: prompt a user to speak a phrase including a personal identifier and a common phrase component, decompose a received spoken phrase, wherein decomposing includes locating the personal identifier within the spoken phrase, and identify and verify the user based on results of the decomposing.

FIG. 6 illustrates a computer network environment 600 in which the present invention may be implemented. In the computer network environment 600, the server 601 is linked through the communication network 602 to the clients 603a-n. The environment 600 may be used to allow the clients 603a-n alone or in combination with the server 601 to execute the various methods described hereinabove. In an example embodiment, the client 603a sends a received spoken phrase 604 to the server 601 via the network 602. The server 601 then performs a method of speaker recognition as described herein, such as the method 330, and as a result sends an identification and verification confirmation 605, via the network 602, to the client 603a. In such an embodiment, the client 603a may be, for example, a bank, and in response to a customer contacting the bank, the bank may employ the method implemented on the server 601 to perform identification and verification of the user.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should also be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of performing automated access control using speaker recognition performed via an automated user-machine interaction, the method comprising:
   identifying a user as a function of a decomposed single spoken phrase that includes a personal identifier within the spoken phrase and a common phrase component within the spoken phrase, the identifying comprising comparing the personal identifier against previously stored identifying information;
   verifying the user as a function of the decomposed single spoken phrase, the verifying comprising comparing the common phrase component but not the personal identifier against one or more previously stored voice prints associated with at least a subgroup of all users represented within the one or more previously stored voice prints; and outputting an indicator, if identified and verified, that enables the user to gain access to a computing system.

2. The computer-implemented method of claim 1 wherein the common phrase component is a component of the spoken phrase common amongst users within at least the subgroup of all users.

3. The computer-implemented method of claim 1 wherein the common phrase component of the spoken phrase comprises two or more sub-phrases and the verifying further includes:
   calculating a respective score for each sub-phrase of the common phrase component, the respective scores indicating a level of correspondence between the two or more sub-phrases and the one or more stored voice prints; and
   verifying the user using the respective scores.

4. The computer-implemented method of claim 3 wherein verifying the user using the respective scores comprises:
   averaging the respective scores; and
   comparing the average against a threshold.

5. The computer-implemented method of claim 1 wherein verifying the user further comprises:
   determining a score indicating a level of correspondence between the common phrase component and the one or more stored voice prints; and
   verifying the user when the score is greater than a threshold.

6. The computer-implemented method of claim 1 further comprising:
   receiving the single spoken phrase; and
   decomposing the received single spoken phrase, the decomposing including locating the personal identifier within the spoken phrase and locating the common phrase component within the spoken phrase.

7. The computer-implemented method of claim 6 wherein decomposing the received single spoken phrase utilizes key word spotting.

8. The computer-implemented method of claim 1 wherein identifying the user comprises:
   determining multiple candidate users associated with the personal identifier; and
   employing voice biometrics to identify the user among the multiple candidate users.

9. The computer-implemented method of claim 8 wherein employing voice biometrics includes:
   comparing the common phrase component of the spoken phrase or the spoken phrase against corresponding previously stored voice prints for each candidate user.

10. A computer system for performing automated access control using speaker recognition performed via an automated user-machine interaction, the computer system comprising:
    a processor; and
    a memory with computer code instructions stored thereon, the processor and the memory, with the computer code instructions being configured to execute an automated user-machine interaction and cause the system to:
       identify a user as a function of a decomposed single spoken phrase that includes a personal identifier within the spoken phrase and a common phrase component within the spoken phrase, the identifying comprising comparing the personal identifier against previously stored identifying information;
       verify the user as a function of the decomposed single spoken phrase, the verifying comprising comparing the common phrase component but not the personal identifier against one or more previously stored voice prints associated with at least a subgroup of all users represented within the one or more previously stored voice prints; and
       output an indicator, if identified and verified, that enables the user to gain access to a computing system.

11. The computer system of claim 10 wherein the common phrase component is a component of the spoken phrase common amongst users within at least the subgroup of all users.

12. The computer system of claim 10 wherein the common phrase component of the spoken phrase comprises two or more sub-phrases and wherein, in the verifying, the processor and the memory, with the computer code instructions, are further configured to cause the system to:
    calculate a respective score for each sub-phrase of the common phrase component, the respective scores indicating a level of correspondence between the two or more sub-phrases and the one or more stored voice prints; and
    verify the user using the respective scores.

13. The computer system of claim 12 wherein, in verifying the user using the respective scores, the processor and the memory, with the computer code instructions, are further configured to cause the system to:
    average the respective scores; and
    compare the average against a threshold.

14. The computer system of claim 10 wherein, in verifying the user, the processor and the memory, with the computer code instructions, are further configured to cause the system to:
    determine a score indicating a level of correspondence between the common phrase component and the one or more stored voice prints; and
    verify the user when the score is greater than a threshold.

15. The computer system of claim 10, wherein the processor and the memory, with the computer code instructions, are further configured to cause the system to:
    receive the single spoken phrase; and
    decompose the received single spoken phrase, the decomposing including locating the personal identifier within the spoken phrase and locating the common phrase component within the spoken phrase.

16. The computer system of 15 wherein, in decomposing the received single spoken phrase, the processor and the memory, with the computer code instructions, are further configured to cause the system to utilize key word spotting.

17. The computer system of claim 10 wherein, in identifying the user, the processor and the memory, with the computer code instructions, are further configured to cause the system to:
    determine multiple candidate users associated with the personal identifier; and
    employ voice biometrics to identify the user among the multiple candidate users.

18. The computer system of claim 17 wherein, in employing voice biometrics, the processor and the memory, with the computer code instructions, are further configured to cause the system to:
    compare the common phrase component of the spoken phrase or the spoken phrase against corresponding previously stored voice prints for each candidate user.

19. A computer program product for performing automated access control using speaker recognition performed via an automated user-machine interaction, the computer program product comprising:

one or more non-transitory computer-readable storage devices and program instructions stored on at least one of the one or more storage devices, the program instructions, when loaded and executed by a processor, cause an apparatus associated with the processor to:
identify a user as a function of a decomposed single spoken phrase that includes a personal identifier within the spoken phrase and a common phrase component within the spoken phrase and compare the personal identifier against previously stored identifying information;
verify the user as a function of the decomposed single spoken phrase, the verifying comprising comparing the common phrase component but not the personal identifier against one or more previously stored voice prints associated with at least a subgroup of all users represented within the one or more previously stored voice prints; and
output an indicator, if identified and verified, that enables the user to gain access to a computing system.

20. The computer program product of claim 19 wherein the common phrase component is a component of the spoken phrase common amongst users within at least the subgroup of all users.

* * * * *